United States Patent
Llopis

(10) Patent No.: US 10,624,498 B2
(45) Date of Patent: Apr. 21, 2020

(54) DEVICE FOR GRINDING COFFEE BEANS

(71) Applicant: SANREMO COFFEE MACHINES SRL, Carbonera, Frazione Vascon (IT)

(72) Inventor: Francesco Daniele Llopis, Cecima (IT)

(73) Assignee: SANREMO COFFEE MACHINES SRL, Carbonera, Frazione Vascon (IT)

( * ) Notice: Subject to any disclaimer, the term of this patent is extended or adjusted under 35 U.S.C. 154(b) by 210 days.

(21) Appl. No.: 15/547,313

(22) PCT Filed: Jan. 27, 2016

(86) PCT No.: PCT/EP2016/051682
§ 371 (c)(1),
(2) Date: Jul. 28, 2017

(87) PCT Pub. No.: WO2016/120315
PCT Pub. Date: Aug. 4, 2016

(65) Prior Publication Data
US 2017/0354296 A1 Dec. 14, 2017

(30) Foreign Application Priority Data
Jan. 28, 2015 (IT) .............................. MI2015A0107

(51) Int. Cl.
A47J 42/00 (2006.01)
A47J 42/18 (2006.01)
(Continued)

(52) U.S. Cl.
CPC .............. A47J 42/18 (2013.01); A47J 42/00 (2013.01); A47J 42/20 (2013.01); B02C 7/06 (2013.01); B02C 7/14 (2013.01); B02C 23/02 (2013.01)

(58) Field of Classification Search
CPC . A47J 42/20; B02C 23/02; B02C 7/14; B02C 7/07
See application file for complete search history.

(56) References Cited

U.S. PATENT DOCUMENTS 1,496,613 A 6/1924 Asbury
2,217,069 A 10/1940 Meeker
(Continued)

FOREIGN PATENT DOCUMENTS

EP 1994866 A1 11/2008
GB 1495893 A 12/1977
WO 2014045230 A1 3/2014

OTHER PUBLICATIONS

International Search Report dated Apr. 8, 2016 re: Application No. PCT/EP2016/051682; pp. 1-4; citing: WO 2014/045230 A1. EP 1 994 866 A1, U.S. Pat. No. 2,217,069 A, GB 1 495 893 A and U.S. Pat. No. 1,496,613 A.
(Continued)

Primary Examiner — Faye Francis
(74) Attorney, Agent, or Firm — Cantor Colburn LLP

(57) ABSTRACT

A device for grinding coffee beans includes a body provided with a vertical hopper for the entry of the coffee beans and a separate vertical outlet for the ground coffee, which are mutually connected by way of a horizontal seat within which a shaft is associated axially and rotatably. A first grinder is keyed to the shaft and interacts with a facing second grinder. These grinders cooperate with elements adapted to allow a first, micro-adjustment and a second, macro-adjustment of the grinding as a function of the type of coffee beans selected.

9 Claims, 6 Drawing Sheets

(51) Int. Cl.
*A47J 42/20* (2006.01)
*B02C 7/06* (2006.01)
*B02C 7/14* (2006.01)
*B02C 23/02* (2006.01)

(56) References Cited

U.S. PATENT DOCUMENTS

| | | | | |
|---|---|---|---|---|
| 5,172,868 | A * | 12/1992 | Midden | A47J 42/16 241/100 |
| 5,645,230 | A * | 7/1997 | Marogna | A47J 31/42 241/100 |
| 7,984,868 | B2 * | 7/2011 | Anson | A47J 42/18 241/261.2 |
| 8,256,696 | B1 * | 9/2012 | Lassota | A47J 42/38 241/36 |
| 2010/0170971 | A1 * | 7/2010 | Doglioni Majer | A47J 42/18 241/30 |
| 2014/0224910 | A1 * | 8/2014 | Sahli | A47J 42/06 241/246 |
| 2015/0238040 | A1 * | 8/2015 | Marchi | A47J 31/42 99/280 |
| 2016/0058244 | A1 * | 3/2016 | Laffi | A47J 31/42 |
| 2016/0120366 | A1 * | 5/2016 | Mazzer | A47J 42/08 241/259 |
| 2016/0192809 | A1 * | 7/2016 | Bakke | A47J 42/06 241/101.2 |

OTHER PUBLICATIONS

Written Opinion dated Apr. 8, 2016 re: Application No. PCT/EP2016/051682; pp. 1-6; citing: WO 2014/045230 A1. EP 1 994 866 A1, U.S. Pat. No. 2,217,069 A, GB 1 495 893 A and U.S. Pat. No. 1,496,613 A.

* cited by examiner

DEVICE FOR GRINDING COFFEE BEANS

TECHNICAL FIELD

The present disclosure relates to a device for grinding coffee.

BACKGROUND

Nowadays machines are known for making and dispensing beverages based on coffee, particularly for the professional sector, such as bars, restaurants, hotels and catering businesses.

They substantially comprise a grinder for the coffee beans, a boiler, a pump, and an assembly for dispensing hot water with which a filter, in which the ground coffee is placed and pressed, can be associated in a downward region.

Therefore once the coffee has been ground, it is pressed in the filter holder which in turn is coupled to the dispenser assembly and then the pump is actuated to dispense the hot water, thus obtaining the infusion.

The coffee that is obtained can vary in its organoleptic characteristics as a function for example of the quantity of ground coffee used, of the degree of grinding, of the level of pressure used, of the time in which the water is dispensed.

Conventional coffee grinders are constituted by a vertical hopper connected to an underlying grinding assembly, which is usually made up of a pair of grinders arranged in axial alignment with the hopper and usually has a ring for adjusting the degree of grinding.

In such coffee grinders, the weight of the coffee present in the hopper influences the granulometry of the ground coffee since the hopper, when it is full, exerts a certain pressure on the ring for adjusting the grinders, bringing them closer together so as to obtain a finer grinding.

As the pressure decreases, the grinders move apart and the grinding becomes coarser: in this way constancy is lacking in the granulometry obtained from the grinding, and therefore the result in the cup is uneven.

Furthermore, conventional coffee grinders on the market have only one adjustment ring adapted to vary the grain size of the ground coffee; such ring is controlled manually or by way of an electric control, but it is calibrated for only one type of coffee beans, for example espresso coffee, coffee creme, regular or Turkish coffee, which however differ greatly from each other and require changing the granulometry type; substantially, changing the type of coffee beans modifies the result in the cup.

In conventional coffee grinders, furthermore, the turning of the grinders entails an overheating that requires the use of liquid cooling systems which increase the running costs.

SUMMARY

The aim of the present disclosure is therefore to resolve the above mentioned technical problems, eliminating the drawbacks in the cited known art and hence providing a device that makes it possible to optimally grind coffee beans thus obtaining a granulometry that is as even as possible.

Within this aim the disclosure provides a device for always obtaining an optimal result in the cup although varying the type of coffee beans used, such as espresso coffee, coffee creme, regular or Turkish coffee.

The disclosure also provides a device for grinding coffee beans which is structurally simple and has low production and maintenance costs.

This aim and these and other advantages which will become better apparent hereinafter are achieved by providing a device for grinding coffee beans, characterized in that it comprises a body provided with a vertical inlet hopper for the coffee beans and with a separate vertical outlet for the ground coffee, which are mutually connected by way of a horizontal seat within which a shaft is associated axially and rotatably, a first grinder being keyed to said shaft and interacting with a facing second grinder, which cooperate with means adapted to allow a first, micro-adjustment and a second, macro-adjustment of the grinding as a function of the type of coffee beans selected.

BRIEF DESCRIPTION OF THE DRAWINGS

Further characteristics and advantages of the disclosure will become better apparent from the detailed description of a particular, but not exclusive, embodiment, which is illustrated by way of non-limiting example in the accompanying drawings wherein.

DETAILED DESCRIPTION OF THE DRAWINGS

Figure 1:
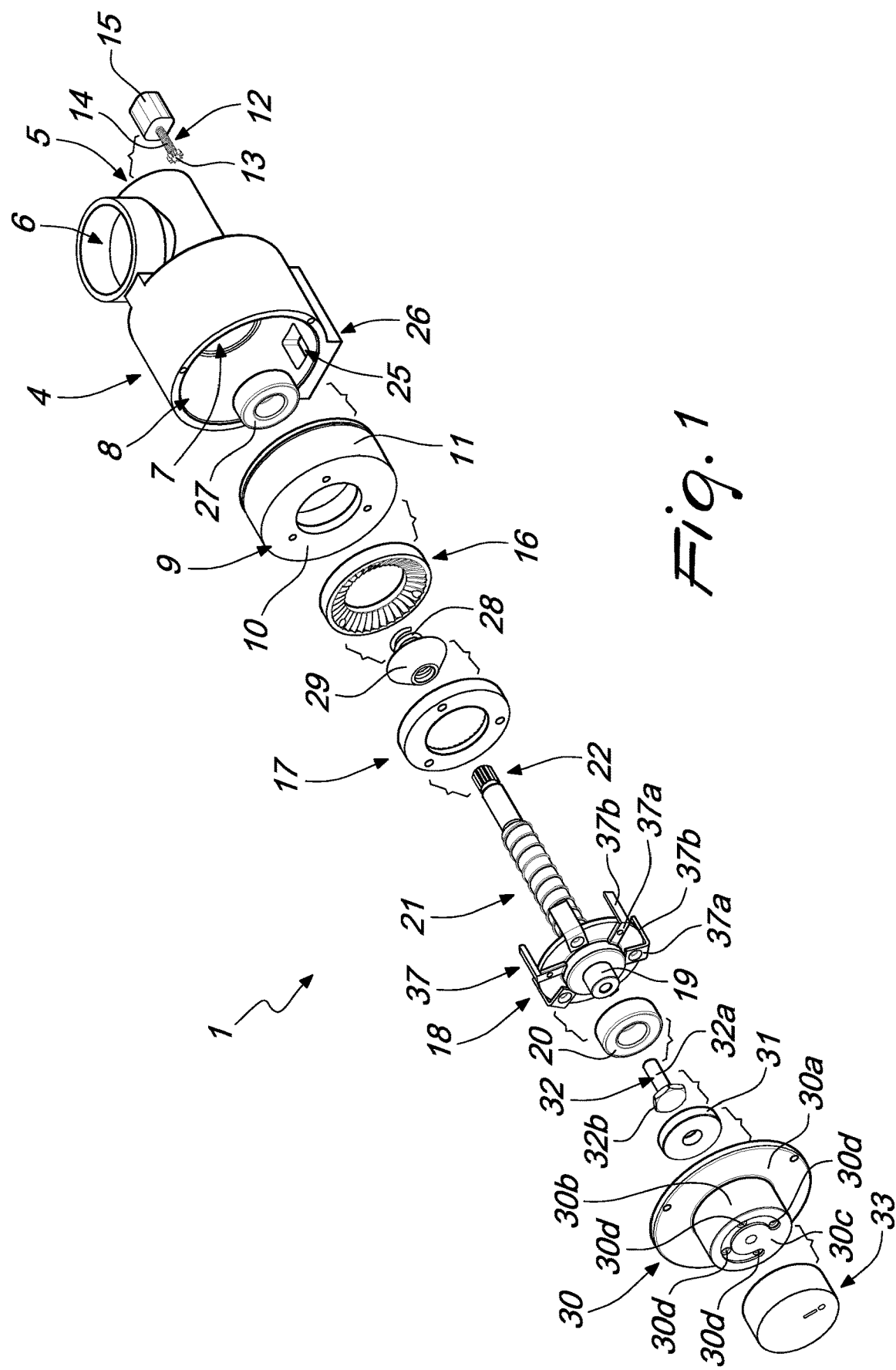
FIG. 1 is an exploded perspective view of a device according to the disclosure.
Figure 2:
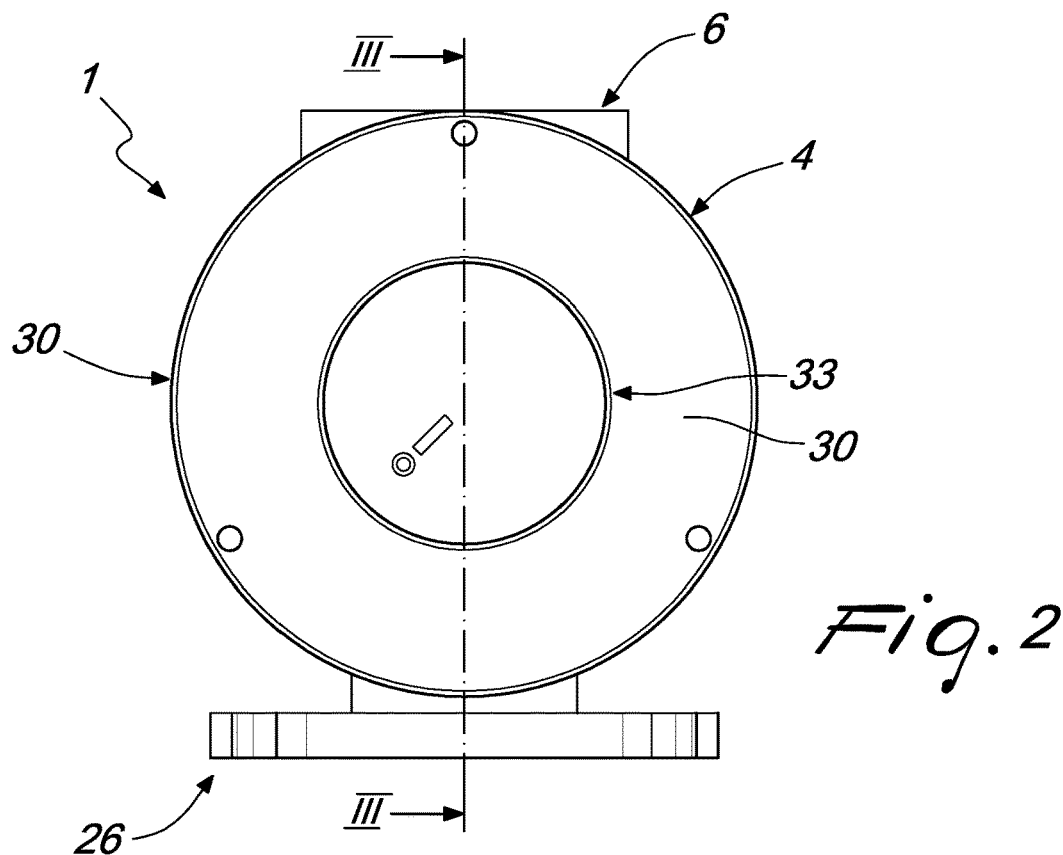
FIG. 2 is a rear view of the device.
Figure 4:
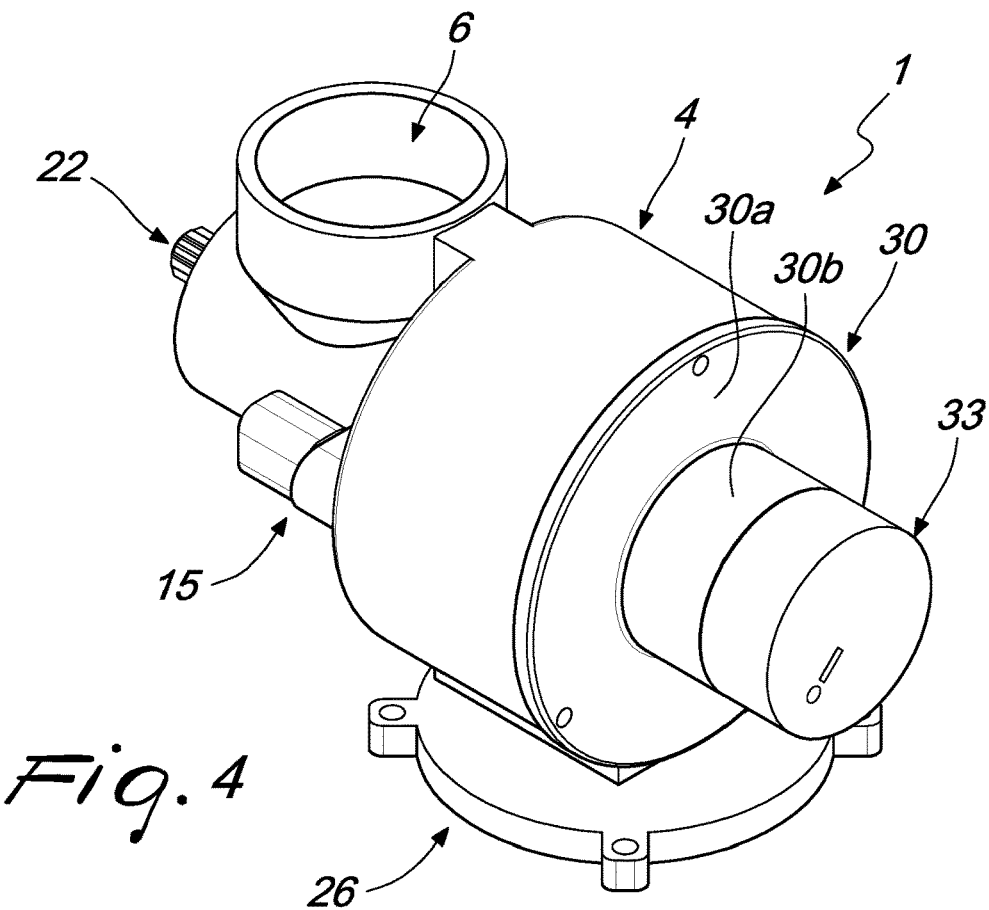
FIG. 4 is a perspective view of the assembled device according to the disclosure.
Figure 3:
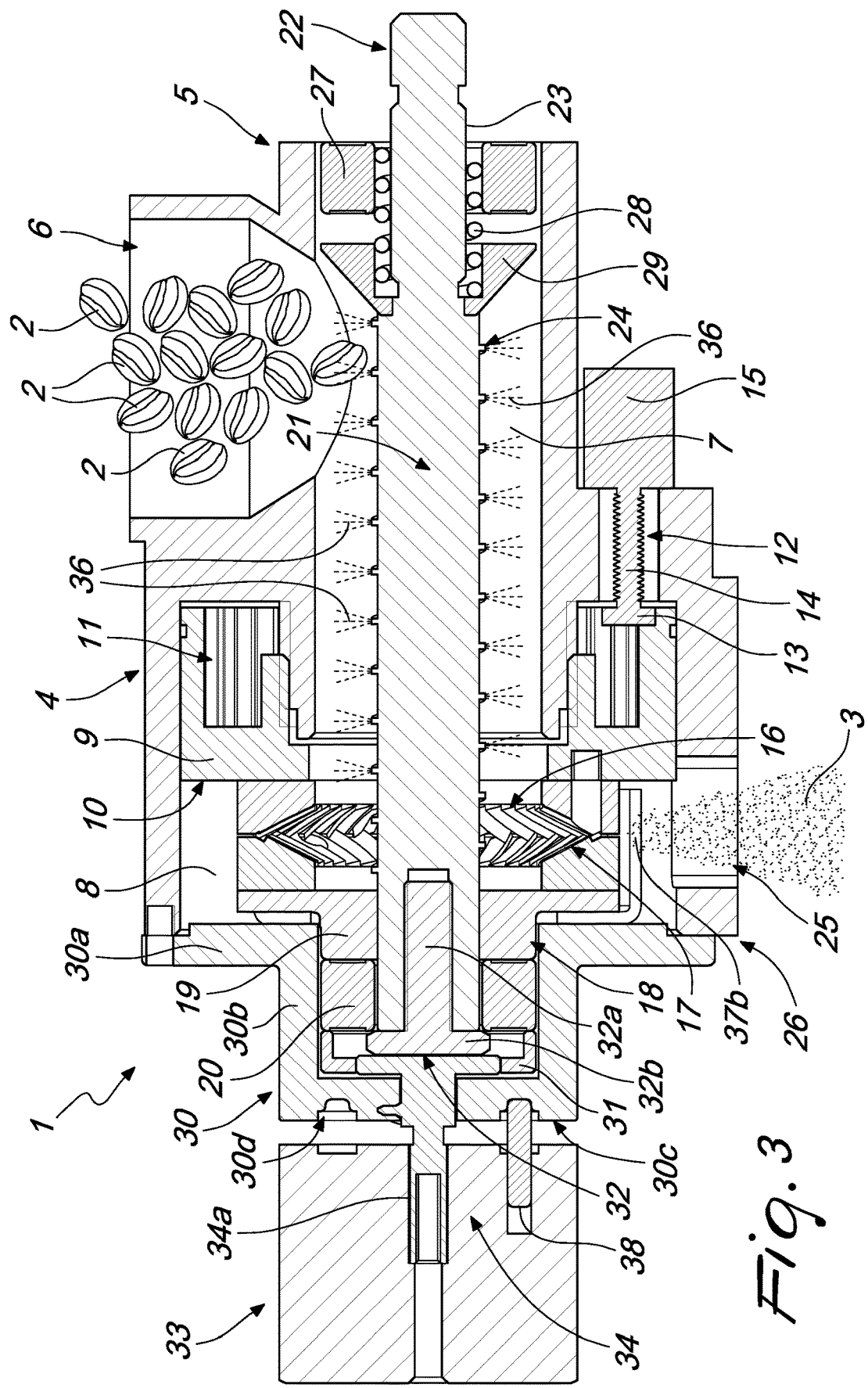
FIG. 3 is a cross-sectional view taken along the line in FIG. 2.
Figure 5:
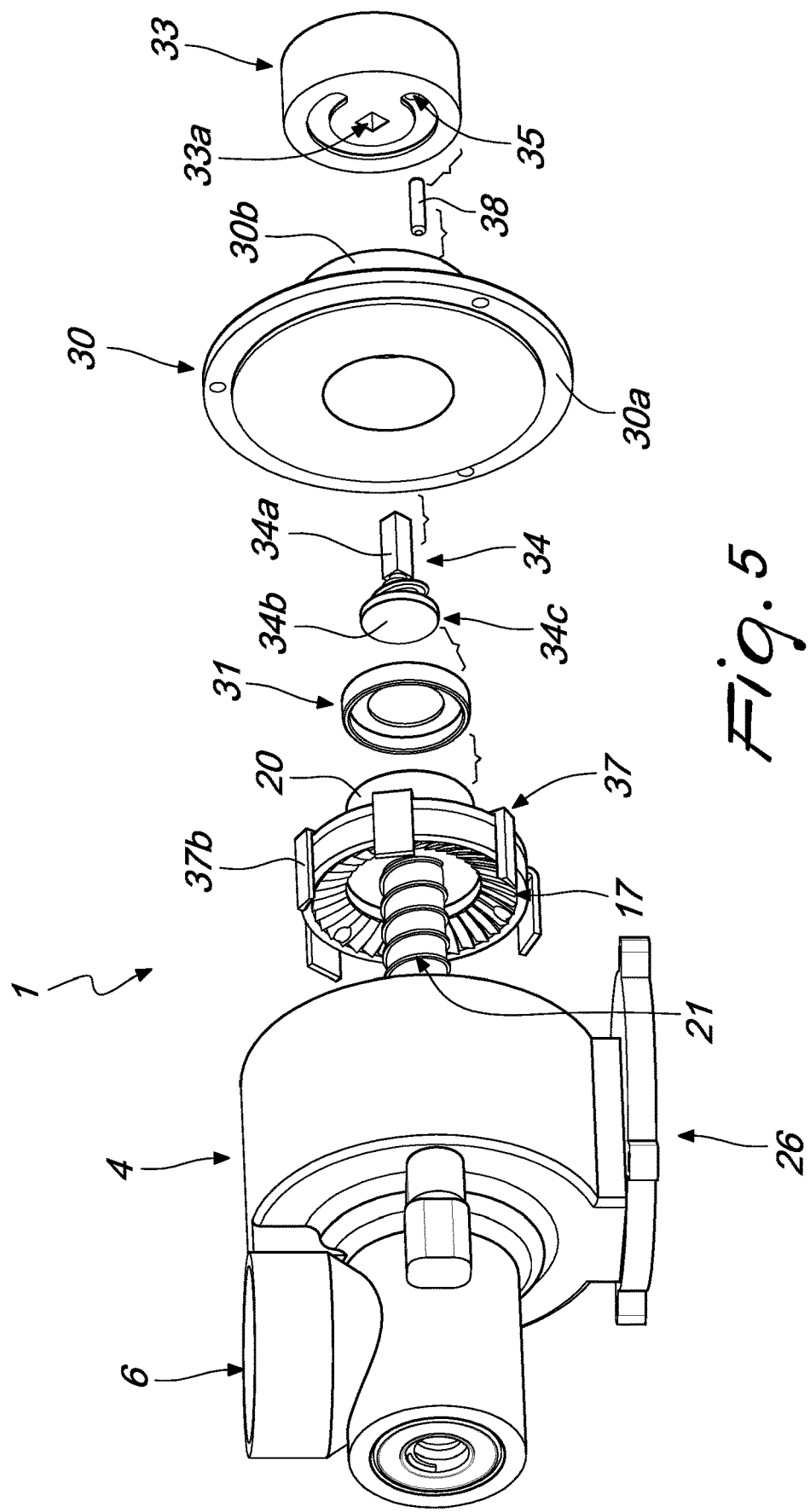
FIG. 5 is a further perspective view, partially exploded, of the device according to the disclosure.
Figure 6:
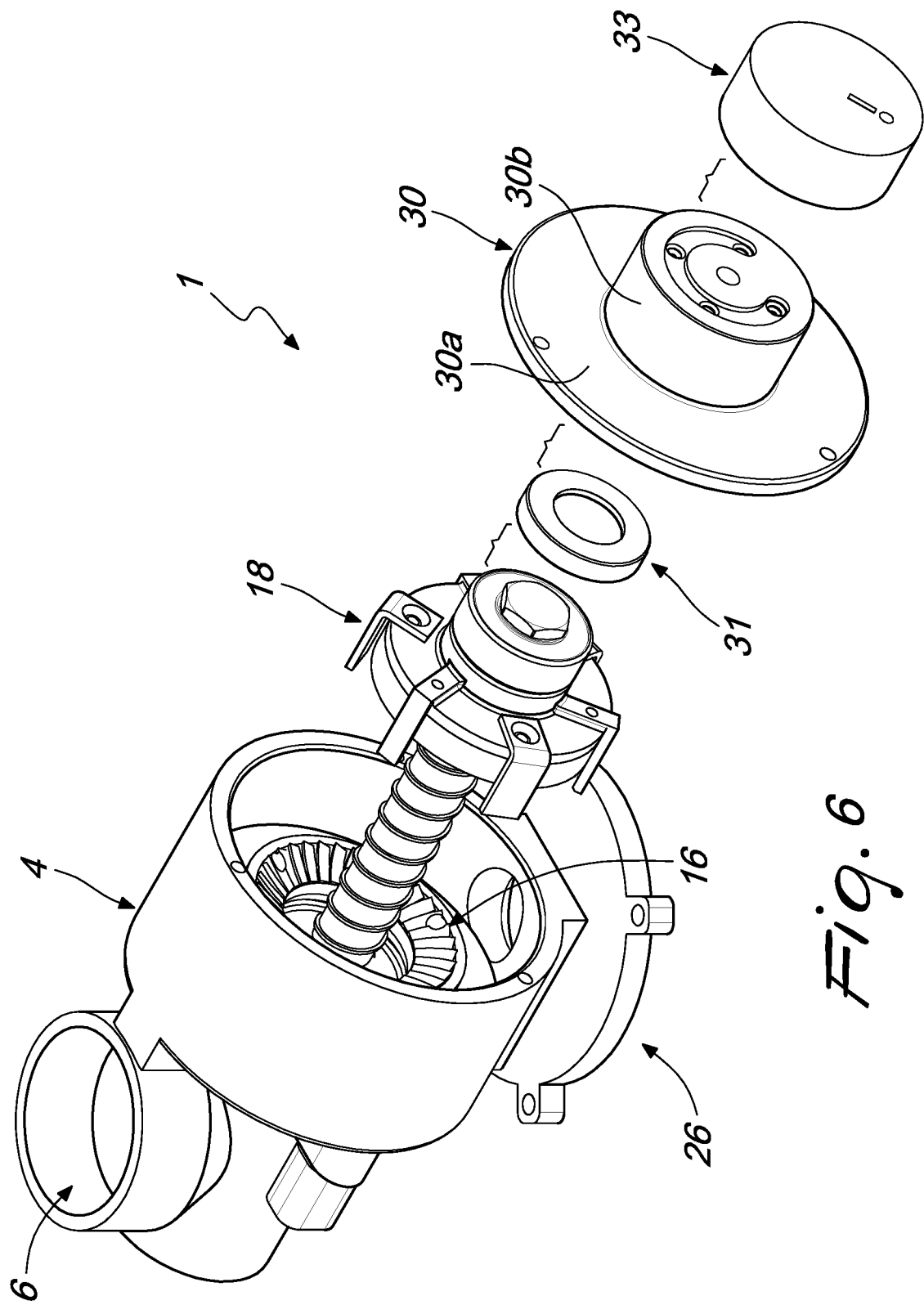
FIG. 6 is a further perspective view, partially exploded, of the device according to the disclosure.
Figure 7:
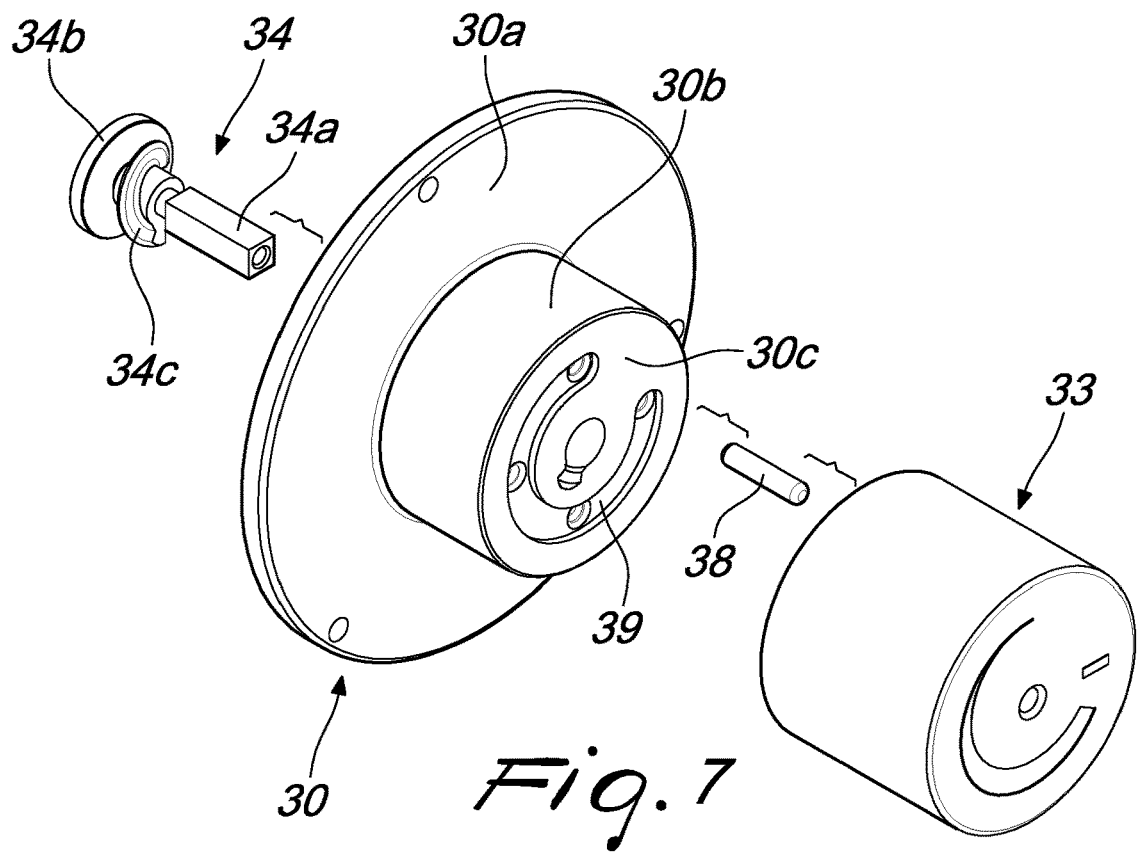
FIG. 7 is a perspective view of the elements of the device of the disclosure.
Figure 8:
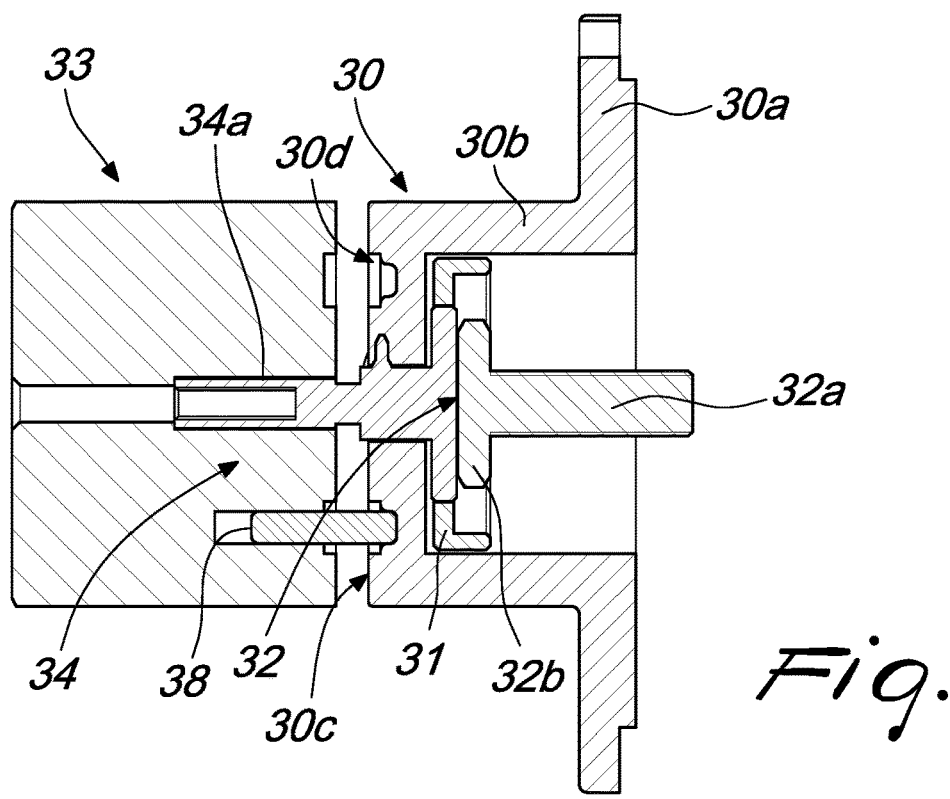
FIG. 8 is a cross-sectional view of the knob.

In the embodiments illustrated, individual characteristics shown in relation to specific examples may in reality be interchanged with other, different characteristics, existing in other exemplary embodiments.

Moreover, it should be noted that anything found to be already known during the patenting process is understood not to be claimed and to be the subject of a disclaimer.

With reference to the figures, the reference numeral 1 generally designates a device for grinding coffee beans 2 which is to be combined with conventional machines for making and dispensing beverages based on coffee, particularly for the professional sector, such as bars, restaurants, hotels and catering businesses, of the type comprising substantially a boiler, a pump, and an assembly for dispensing hot water with which a filter, in which ground coffee 3 is placed and pressed, can be associated in a downward region.

The device 1 is constituted by a substantially cylindrical body 4 from which protrudes, at a first end 5, an inlet hopper 6 for the coffee beans 2.

The hopper 6 has a cup-like shape, open downward, and conveys the coffee beans 2 into an underlying seat 7 which is provided axially to the body 4.

The seat 7, preferably cylindrical, has an open end, which coincides with the first end 5 of the body 4, and at the opposite end is connected to a chamber 8, which is preferably cylindrical and has a greater diameter than that of the seat 7.

A cylindrical bush 9 is associated so that it can slide, for part of its length, coaxially and internally with respect to the chamber 8 and has a substantially C-shaped transverse cross-section so as to define a flat base 10, directed away from the first end 5, and a lateral wall 11 which slides inside the chamber 8.

The position of the bush 9 is adjustable axially to the chamber 8 by means of a first screw 12, which is associated with the body 4 below the seat 7 and has a head 13 connected to an end of the bush 9 and a shank 14 associated with a gearmotor 15 which is external to the body 4 and makes it possible to axially adjust the first screw 11.

The gearmotor 15 can be mechanically or electrically driven, optionally by way of an adapted electronic circuit.

Outside the bush 9, on the opposite side from the first end 5 of the body 4, there is a first grinder 16, which rotates and can be adjusted axially by way of the movement of the bush 9, and a facing second grinder 17, which interacts with a support 18 constituted by an axially perforated disk from which an axially perforated pivot 19 protrudes axially for abutment against a first bearing 20.

A shaft 21 is associated axially and rotatably inside the seat 7 and its length exceeds that of the seat 7 and chamber 8.

The shaft 21 has a second end 22, which protrudes beyond the first end 5 of the body 4 and defines a first, smooth portion 23 joined to a second portion 24 which has a screw feeder-like shape that is adapted to push the coffee beans 2 that arrive from the hopper 6 in the direction of an outlet 25 for the ground coffee 3 which is below the chamber 8 proximate to its third end 26.

The shaft 21 is supported so that it can rotate, proximate to the second end 22, by a second bearing 27 which is associated with the body 4 at the first end 5.

A spring 28 slides coaxially to the first portion 23 and to the second bearing 27 and works in contrast with a wedge-shaped retention element 29 that abuts against a step-like discontinuity that divides the first and second portions 23, 24.

The spring 28 allows the support 18 and the shaft 21 to move axially.

The axial mobility of the bush 9 makes it possible to vary in a first manner the granulometry of the ground coffee 3 since the axial position of the first grinder 16 is varied.

In this way a first, micro-adjustment of the granulometry is obtained.

Finally there is a closing lid 30 which is substantially T-shaped with a flat head 30a and a cylindrical shank 30b; the head 30a can be perimetrically associated with the third end 26 of the bush 9; the lid 30 further fastens an axially perforated covering disk 31 on a T-shaped rivet 32 whose shank 32a is screwed axially to the pivot 19 and whose head 32b locks the first bearing 20.

Furthermore there is a cylindrical knob 33 which cooperates with a pin 34; the knob 33 has an axial seat 33a, square in plan, which is a seat for a complementarily shaped shank 34a of a pin 34 which is insertable inside an adapted hole that is defined axially to the closing lid 30.

The pin 34 has a flat head 34b which rests on the head 32b of the screw 32.

Between the head 34b and the shank 34a there is a helical appendage 34c which interacts with a complementarily shaped seat which is provided on the head 30a of the lid 30 so that the knob can, upon a rotation thereof, move axially, in one direction or in the other, the screw 32 and as a consequence the second grinder 17.

On the flat surface 30c of the head 30a there are adapted first seats 30d for temporarily arranging therein a ball or locator 35 which is associated, in contrast with an optional spring, with the knob 33 in order to produce a click when the knob reaches a certain rotation.

The knob 33 can therefore be rotated so as to be positioned according to a plurality of desired positions which can for example correspond to a preset granulometry for the coffee grinder of the type of espresso coffee, coffee creme, regular or Turkish coffee.

The function of the knob is therefore to make it possible to vary the granulometry of the ground coffee 3 in a second manner; in this way a second, macro-adjustment of the granulometry is obtained.

A plurality of brushes 36 are associated with and protrude radially from the second portion 24, which has a screw feeder-like shape, and their function is to push the coffee beans 2 toward the first and the second grinder 16, 17.

In the solution shown, therefore the body 4 always remains clean inside and free from coffee beans at the end of each cycle, by way of the presence of the brushes 36.

Also present are L-shaped blades 37, a smaller wing 37a of which is coupled radially to the support 18 constituted by a perforated disk, and a larger wing 37b of which is arranged axially to the shaft 21; the function of such blades is to facilitate the egress of the ground coffee 3.

The knob 33 is further associated with a stroke limit which is constituted by an insert 38 which protrudes therefrom, at right angles but offset, in the direction of the flat surface 30c of the head 30a on which a second, curved seat 39 of the desired length is provided.

The insert 38 is accommodated and guided in the second seat 39, thus limiting the rotation that can be imparted to the knob 33.

From the procedural point of view, the macro-adjustment is carried out first, by way of example in four different positions, and then the micro-adjustment.

The adjustments that can be performed are therefore the following: a macro-adjustment that makes it possible to decide which type of beverage to dispense, such as an espresso coffee, coffee creme, regular or Turkish coffee, followed by a micro-adjustment in order to refine the granulometry and obtain the ideal grinding.

Thus it has been found that the disclosure fully achieves the intended aim and objects, a device having been obtained that makes it possible to grind coffee beans while obtaining a granulometry that is even and constant over time irrespective of the load of the hopper.

Furthermore it is possible to vary the granulometry of the ground coffee as a function for example of the type, espresso coffee, coffee creme, regular or Turkish coffee, thus always obtaining an optimal result in the cup.

Use of the two adjustments for the two grinders further makes it possible to keep the granulometry and organoleptic qualities of the ground coffee constant.

The use of a screw-feeder shaft 21 provided with brushes makes it possible to entrain the coffee beans directly onto the two grinders, thus keeping the feeder conduit always clean and always ensuring a constant temperature of use which is such as to prevent harmful overheating.

Obviously the materials used as well as the dimensions of the individual components of the disclosure may be more relevant according to specific requirements.

The characteristics indicated above as advantageous, convenient or the like, may also be missing or be substituted by equivalent characteristics.

The invention claimed is:

1. A device for grinding coffee beans, comprising a body provided with a vertical inlet hopper for coffee beans and with a separate vertical outlet for ground coffee, which are mutually connected by way of a horizontal seat within which a shaft is associated axially and rotatably, a first axially movable grinder being keyed to said shaft and cooperating with means adapted to allow a first micro-adjustment of the granulometry of the ground coffee, and said first grinder interacting with a second axially movable grinder facing said first grinder, said first and second grinders cooperate with means adapted to allow a second macro-adjustment of the grinding of the ground coffee as a function of the type of coffee beans selected.

2. The device according to claim 1, wherein the inlet hopper for the coffee beans protrudes at a first end from a cylindrical body, said hopper having a cup shape that is open downward and conveys the coffee beans into said underlying horizontal seat which is defined axially to said body, said horizontal seat having an open end coinciding with said first end, and being connected at an opposite end to a chamber having a diameter larger than the diameter of said seat.

3. The device according to claim 1, wherein a cylindrical bush is associated so that it can slide, for part of its length, coaxially and internally with respect to said chamber and has a C shaped transverse cross-section so as to define a flat base, directed away from said first end, and a lateral wall which slides inside said chamber, a position of said bush being adjustable axially to said chamber by means of a screw, which is associated with said body below said horizontal seat and has a head connected to an end of said bush and a shank associated with a gearmotor which is external to said body and makes it possible to axially adjust said screw.

4. The device according to claim 3, wherein said first grinder is disposed outside said bush, on an opposite side from said first end of said body, the grinder rotates and axially adjustable by way of the movement of said bush, and faces said second grinder, which interacts with a support constituted by an axially perforated disk from which an axially perforated pivot protrudes axially for abutment against a first bearing.

5. The device according to claim 4, wherein said shaft is associated axially and rotatably within said horizontal seat and is longer than said horizontal seat and said chamber, said shaft having a second end, which protrudes beyond said first end of said body and defines a first, smooth portion joined to a second portion which has a screw feeder shape adapted to push the coffee beans that arrive from said hopper to an outlet for the ground coffee arranged below said chamber proximate to a third end thereof.

6. The device according to claim 5, wherein said shaft is supported so that it rotates, at said second end, by a second bearing associated with said body at said first end.

7. The device according to claim 6, wherein a spring slides coaxially to said first portion and to said second bearing and works in contrast with a wedge-shaped retention element that abuts at its apex against a step discontinuity that divides said first and second portions, said spring allowing said support and said shaft to move axially.

8. The device according to claim 3, wherein an axial mobility of said bush makes it possible to determine a granulometry of the ground coffee.

9. The device according to claim 5, further comprising a closing lid associated with said third end of said bush and further fastens a cover on a rivet associated axially with said pivot and locks said perforated disk.

* * * * *